(12) United States Patent
Jang et al.

(10) Patent No.: US 10,739,205 B2
(45) Date of Patent: Aug. 11, 2020

(54) TEMPERATURE SENSOR PATCH AND ADHESIVE TYPE THERMOMETER INCLUDING THE SAME

(71) Applicant: Haesung DS CO., Ltd., Changwon-si, Gyeongsangnam-do (KR)

(72) Inventors: Jae Hoon Jang, Seoul (KR); Ho Sang Yu, Seoul (KR); Jin Woo Lee, Seoul (KR)

(73) Assignee: HAESUNG DS CO., LTD., Changwon-Si (KR)

( * ) Notice: Subject to any disclaimer, the term of this patent is extended or adjusted under 35 U.S.C. 154(b) by 526 days.

(21) Appl. No.: 15/651,374

(22) Filed: Jul. 17, 2017

(65) Prior Publication Data
US 2018/0172520 A1    Jun. 21, 2018

(30) Foreign Application Priority Data
Dec. 20, 2016   (KR) .................. 10-2016-0174772

(51) Int. Cl.
*G01K 1/00* (2006.01)
*G01K 1/14* (2006.01)
*G01K 13/00* (2006.01)

(52) U.S. Cl.
CPC ........... *G01K 1/143* (2013.01); *G01K 13/002* (2013.01)

(58) Field of Classification Search
CPC combination set(s) only.
See application file for complete search history.

(56) References Cited

U.S. PATENT DOCUMENTS

| 8,061,891 | B2 | 11/2011 | Lin | |
| 2009/0030289 | A1* | 1/2009 | Katayama | A61B 5/0008 600/301 |
| 2010/0160763 | A1* | 6/2010 | Tsai | A61B 5/0408 600/393 |

(Continued)

FOREIGN PATENT DOCUMENTS

| JP | 07-333073 | 12/1995 |
| JP | 2015534495 | 12/2015 |

(Continued)

OTHER PUBLICATIONS

KIPO; KR office action for KR 10-2016-00174772; dated Jun. 1, 2017; 5 pages.

(Continued)

*Primary Examiner* — Lisa M Caputo
*Assistant Examiner* — Nasir U. Ahmed
(74) *Attorney, Agent, or Firm* — Schwabe, Williamson & Wyatt, P.C.

(57) ABSTRACT

Provided is a temperature sensor patch including: a base material having a lower surface that is an adhesive surface; a temperature sensor layer arranged on the base material, and including a temperature sensor at a side thereof and a connection terminal connected to the temperature sensor at the other side thereof; a cover layer configured to cover the temperature sensor layer and including a first opening exposing the connection terminal; and a module holder disposed inside the first opening, wherein a portion of the temperature sensor layer, where the connection terminal is arranged, is disposed on the module holder.

12 Claims, 7 Drawing Sheets

(56) References Cited

U.S. PATENT DOCUMENTS

| | | | |
|---|---|---|---|
| 2013/0187789 A1* | 7/2013 | Lowe ................ | G08C 19/16 340/870.02 |
| 2014/0121557 A1* | 5/2014 | Gannon ............. | A61B 5/002 600/549 |
| 2015/0250422 A1* | 9/2015 | Bay .................. | A61B 5/6833 600/391 |
| 2016/0183794 A1* | 6/2016 | Gannon ............. | G01K 13/002 600/549 |

FOREIGN PATENT DOCUMENTS

| | | |
|---|---|---|
| TW | 358279 | 2/2012 |
| TW | 521454 | 5/2016 |
| TW | 1558371 | 11/2016 |
| WO | 2014057083 | 4/2014 |

OTHER PUBLICATIONS

Taiwan Patent Office; TW application No. 106122345, Office Action dated May 9, 2018 and search report with English Summary of OA.

* cited by examiner

TEMPERATURE SENSOR PATCH AND ADHESIVE TYPE THERMOMETER INCLUDING THE SAME

CROSS-REFERENCE TO RELATED APPLICATION

This application claims the benefit of Korean Patent Application No. 10-2016-0174772, filed on Dec. 20, 2016, in the Korean Intellectual Property Office, the disclosure of which is incorporated herein in its entirety by reference.

BACKGROUND

1. Field

One or more embodiments relate to a temperature sensor patch and an adhesive type thermometer including the temperature sensor patch, and more particularly, to an adhesive type thermometer capable of being easily attached to/detached from a module having a temperature sensor patch, a battery, etc. built therein.

2. Description of the Related Art

As generally known, temperature is a bio-signal used in indicating the status of the immune system of a human body, e.g., in identifying whether the body is in an abnormal state. In particular, a variation in temperature of an infant or a patient having a weak immune system needs to be continuously monitored. According to the above necessity, research has been actively conducted in developing a thermometer combining a medical device and an information-technology (IT) device.

For example, techniques for monitoring temperature in real-time by attaching a thermometer combining a temperature sensor for measuring temperature, a battery, and a wireless communication module to a skin of a human body to measure the temperature in real-time and by transmitting the measured temperature as a wireless signal have been provided.

SUMMARY

According to one or more embodiments, a temperature sensor patch includes: a base material having a lower surface that is an adhesive surface; a temperature sensor layer arranged on the base material, the temperature sensor layer including a temperature sensor disposed at a side of the temperature sensor layer and a connection terminal connected to the temperature sensor and disposed at another side of the temperature sensor layer; a cover layer configured to cover the temperature sensor layer and including a first opening exposing the connection terminal; and a module holder disposed inside the first opening, wherein a portion of the temperature sensor layer on which the connection terminal is arranged, is disposed on the module holder.

The base material may include a second opening in a portion of the base material corresponding to an electrode pattern.

The temperature sensor of the temperature sensor layer may be formed by printing an electrode pattern for sensing temperature on a flexible substrate by using a conductive polymer ink.

The temperature sensor of the temperature sensor layer may include a thermistor, and the connection terminal may be arranged on a flexible substrate.

The temperature sensor layer and the cover layer may be attached by an upper adhesive layer, and the cover layer may include a non-woven fabric.

The module holder may include a cantilever having a fixed end and a free end, and a location of the cantilever may correspond to a location of the connection terminal.

According to one or more embodiments, an adhesive type thermometer includes: a temperature sensor patch; and a module attachable with and detachable from the temperature sensor patch and configured to sense temperature, wherein the temperature sensor patch includes: a temperature sensor layer including a temperature sensor disposed at a side of the temperature sensor layer and a connection terminal connected to the temperature sensor and disposed at another side of the temperature sensor layer; and a module holder on which a portion of the temperature sensor layer including the connection terminal is disposed, and the module includes: a housing, through which a module terminal is exposed to outside; a battery arranged in the housing; a controller configured to calculate a temperature value; and a transmitter configured to wirelessly transmit the temperature value, wherein the module terminal and the connection terminal contact each other when the module is coupled to the module holder.

The temperature sensor patch may further include: a base material disposed under the temperature sensor layer and having a lower surface that is an adhesive surface; and a cover layer configured to cover the temperature sensor layer and including a first opening exposing the connection terminal, and the module holder may be arranged in the first opening.

The base material may include a second opening at a portion of the base material corresponding to the temperature sensor.

The temperature sensor of the temperature sensor layer may be formed by printing an electrode pattern for sensing temperature on a flexible substrate by using a conductive polymer ink.

The temperature sensor of the temperature sensor layer may include a thermistor, and the connection terminal may be arranged on a flexible substrate.

The module holder may include a cantilever having a fixed end and a free end, and a location of the cantilever may correspond to a location of the connection terminal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
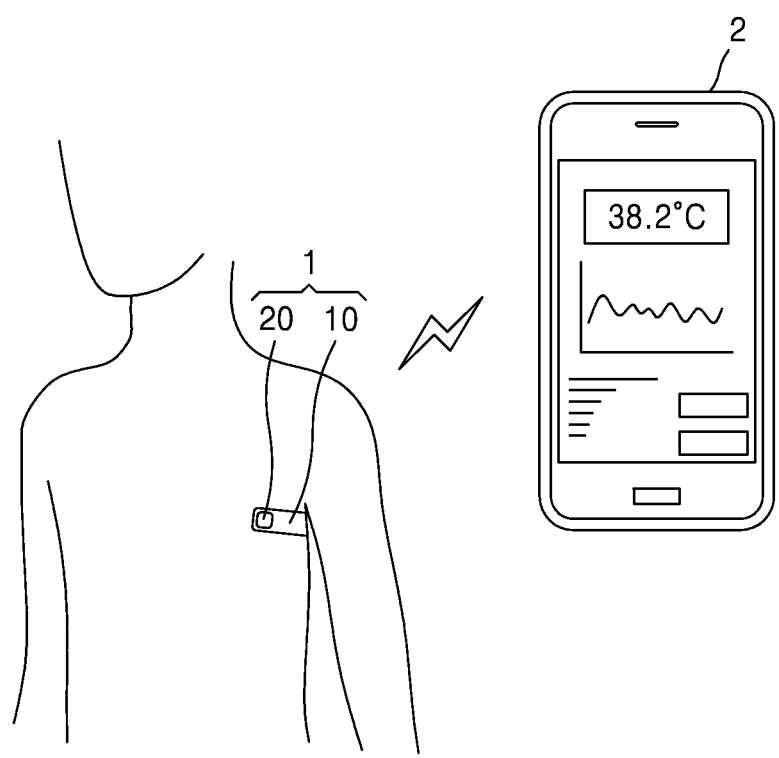
FIG. 1 is a diagram showing an adhesive type thermometer according to an embodiment being attached to a human body and transmitting a measured temperature to a computing device.

As the present disclosure allows for various changes and numerous embodiments, particular embodiments will be illustrated in the drawings and described in detail in the written description. The attached drawings for illustrating one or more embodiments are referred to in order to gain a sufficient understanding, the merits thereof, and the objectives accomplished by the implementation. However, the embodiments may have different forms and should not be construed as being limited to the descriptions set forth herein.

The exemplary embodiments will be described below in more detail with reference to the accompanying drawings. Those components that are the same or are in correspondence are rendered the same reference numeral regardless of the figure number, and redundant explanations are omitted.

While such terms as "first," "second," etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that when a layer, region, or component is referred to as being "formed on" or "under" another layer, region, or component, it can be directly or indirectly formed on or under the other layer, region, or component. That is, for example, intervening layers, regions, or components may be present. Upper and lower portions may be classified based on the drawings.

Sizes of components in the drawings may be exaggerated for convenience of explanation. In other words, since sizes and thicknesses of components in the drawings are arbitrarily illustrated for convenience of explanation, the following embodiments are not limited thereto. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram showing an adhesive type thermometer 1 according to an embodiment attaching to a human body and transmitting a measured temperature to a computing device 2.

As shown in FIG. 1, the adhesive type thermometer 1 according to the embodiment may be attached to various parts of a human body, such as the torso, arms, legs, etc., but may be possibly attached to the armpit for precisely measuring a temperature.

The adhesive type thermometer 1 may be attached to the human body for a long period of time, e.g., 12 to 24 hrs., to measure the temperature, and may periodically transmit the measured temperature to the computing device 2. The adhesive type thermometer 1 may contain a medical dermal contactable adhesive that may be applied to the skin of the human body. However, various compressive material that is generally flexible may be used. Additionally, the adhesive type thermometer 1 may have a function of sensing various other phenomena via a plurality of sensors. For example, the adhesive type thermometer 1 may sense some or all of peripheral temperature, peripheral humidity, peripheral light, sound, and/or radioactive level, body performance of a patient, time, movement of a patient (e.g., via an accelerometer), etc.

The temperature measured by the adhesive type thermometer 1 may be transmitted to the computing device 2 such as a portable computer, a smartphone, a tablet, etc. via a wireless communication network. The computing device 2 may include a programmable microprocessor that may drive an application, a power source (battery or an alternating current (AC) line power), a display, and a transceiver capable of communicating with the adhesive type thermometer 1 bi-directionally. Additionally, the computing device 2 may perform communication via a wide area network (WAN) including Internet and World Wide Web, and local area network (LAN). The measuring of temperature may be performed according to a command and/or in a predetermined cycle, and may be locally stored in a memory of the adhesive type thermometer 1 and/or a memory of a reading device (e.g., a smartphone, a tablet, a portable computer, a sensor, etc.).

Here, the wireless communication network may be a near distance wireless communication network using various communication methods such as a Blue-tooth network, a Zigbee network, a Wi-Fi network, a near field communication (NFC) network, etc.

A person reading temperature information (or an automated device) do not need to wake up a patient who is wearing the adhesive type thermometer 1, and an instant temperature and/or temperature history of the patient during some or all the time period in which the patient is sleeping may be displayed in a graphic and/or text-based format (e.g., a list, a table, a chart, etc.).

Figure 2:
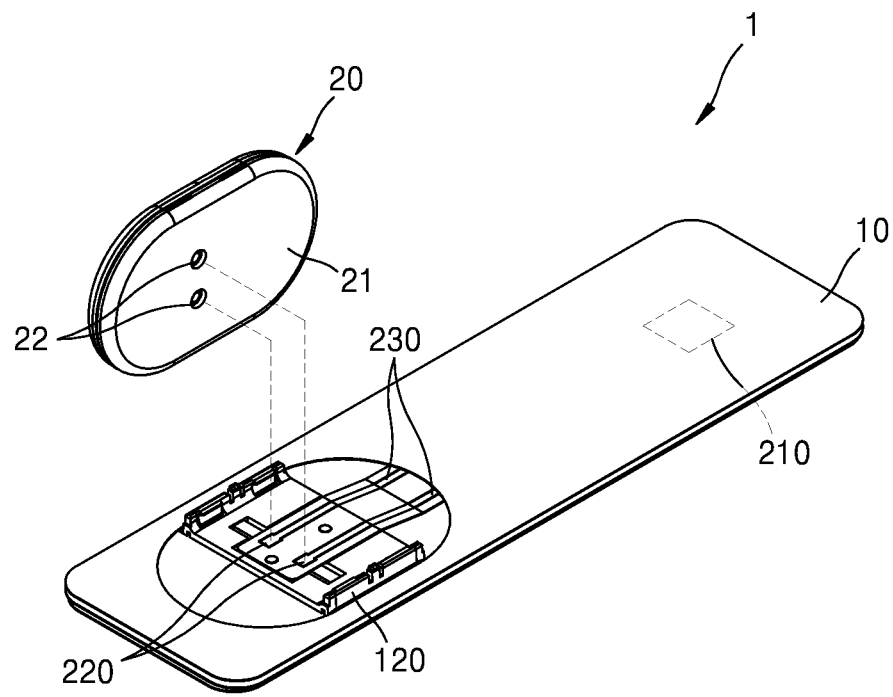
FIG. 2 is an exploded perspective view of an adhesive type thermometer according to an embodiment.
Figure 3:
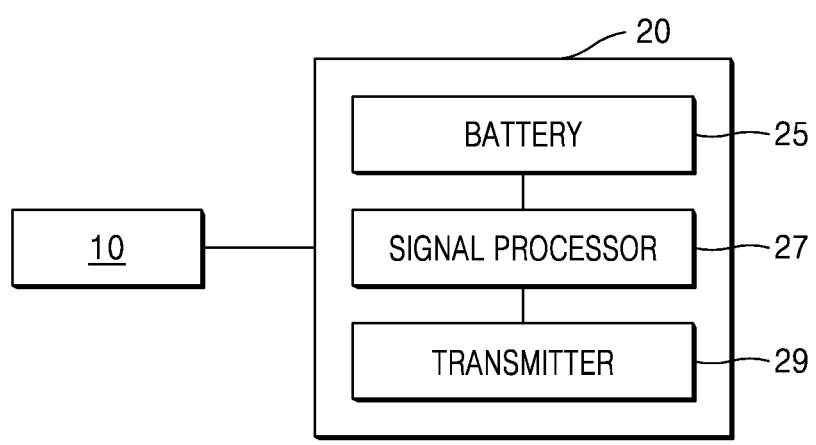
FIG. 3 is a schematic block diagram of an adhesive type thermometer according to an embodiment.

FIG. 2 is an exploded perspective view of the adhesive type thermometer 1 according to the embodiment, and FIG. 3 is a schematic block diagram of the adhesive type thermometer 1 according to the embodiment.

Referring to FIGS. 2 and 3, the adhesive type thermometer 1 may include a temperature sensor patch 10 and a module 20. The temperature sensor patch 10 and the module 20 are provided to be easily attached to/detached from each other.

The temperature sensor patch 10 having an electrode pattern 210 for sensing the temperature therein is attached to the skin, and includes a module holder 120. A connection terminal 220 of the temperature sensor patch 10 is arranged in the module holder 120. In addition, the module 20 includes a battery 25, a signal processor 27 calculating a temperature value, and a transmitter 29 transmitting the temperature value, and the battery 25, the signal processor 27, and the transmitter 29 are included in a housing 21. A module terminal 22 that may contact the connection terminal 220 is provided outside the housing 21. The module 20 is inserted to the module holder 120 via the module terminal 22, and the module holder 120 may contact the connection terminal 220 to be electrically connected thereto.

Since the temperature sensor patch 10 is electrically connected to the connection terminal 220, the signal processor 27 may read an output value of the temperature sensor 210 that senses the temperature via the connection terminal 220 and calculates the temperature value from the output value. Here, the temperature sensor 210 denotes a region including a material, an output value of which varies depending on a variation in the temperature. For example, the output value of the temperature sensor 210 may be a resistance value, and the signal processor 27 reads the resistance value of the temperature sensor 210 and calculates the temperature value from the resistance value. The transmitter 29 transmits the temperature value calculated by the signal processor 27 to the computing device 2 via the wireless communication network. The module 20 may include the battery 25 as a power source for driving the signal processor 27 and the transmitter 29.

The adhesive type thermometer 1 according to the embodiment is designed so that the temperature sensor patch 10 and the module 20 may be easily attached/detached. Accordingly, the temperature sensor patch 10 that is easily contaminable may be disposable, and the module 20 may be repeatedly used. Since the module 20 is relatively more expensive than the temperature sensor patch 10, the repeated usage of the module 20 may be economically advantageous.

In addition, as described above, since the temperature may be measured from the armpit, a side of the temperature sensor patch 10, on which the temperature sensor 210 for sensing the temperature is arranged, may be provided as a thin tape in order to reduce a feeling of irritation, and the module 20 may be arranged on the other side where the temperature sensor 210 is not arranged. A distance between the temperature sensor 210 and the module 20 may vary depending on conditions of the human body.

Figure 4:
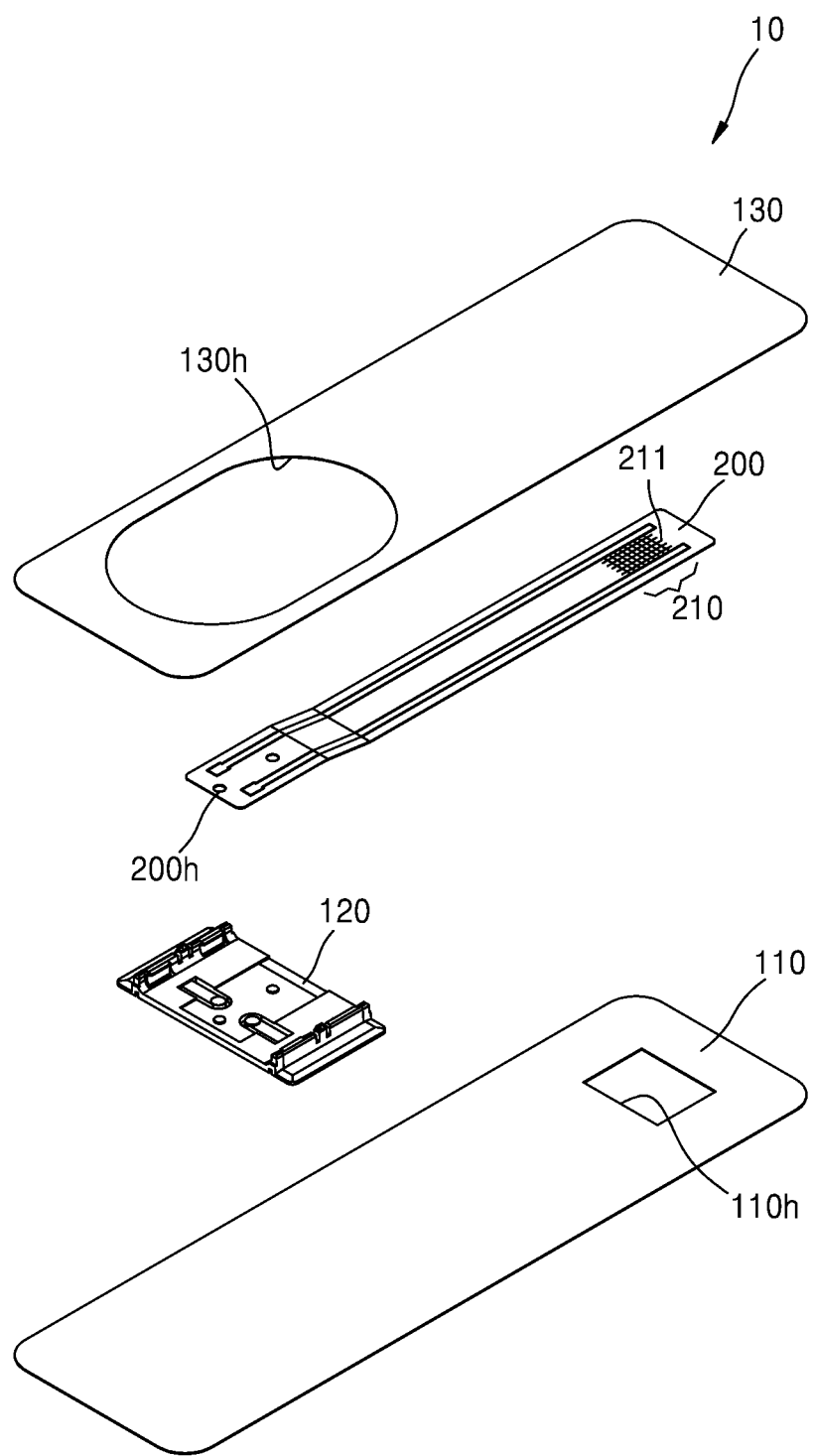
FIG. 4 is an exploded perspective view of a temperature sensor patch according to an embodiment.
Figure 5:
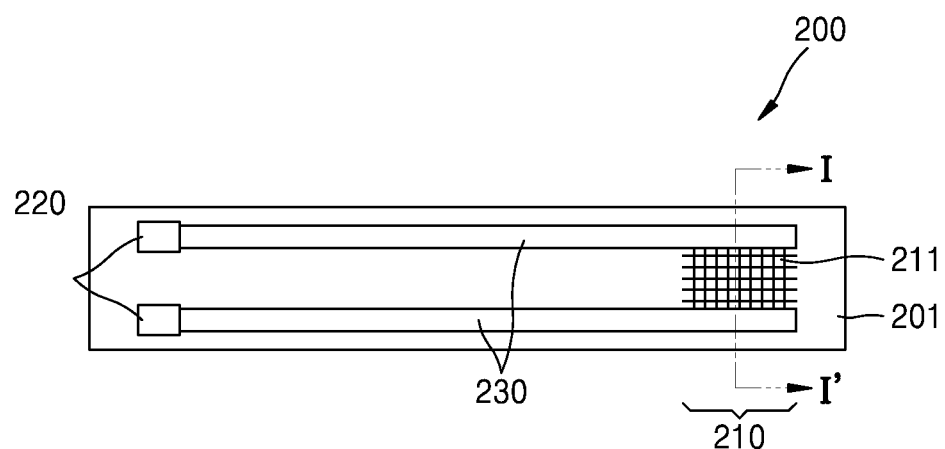
FIG. 5 is a plan view of a temperature sensor layer according to an embodiment.
Figure 6:
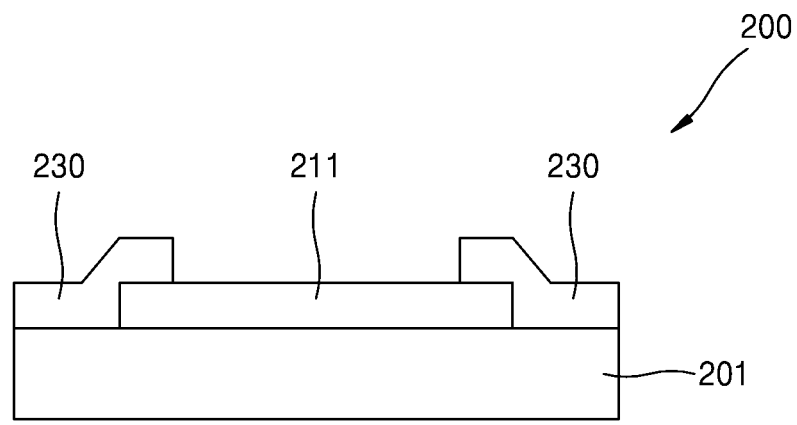
FIG. 6 is a cross-sectional view taken along a line I-I' of FIG. 5.

FIG. 4 is an exploded perspective view of the temperature sensor patch 10 according to the embodiment, FIG. 5 is a plan view of a temperature sensor layer 200 that may be built in the temperature sensor patch 10, and FIG. 6 is a cross-sectional view taken along a line I-I' of FIG. 5.

Referring to FIG. 4, the temperature sensor patch 10 may include a base material 110, the temperature sensor layer 200, a cover layer 130, and the module holder 120. Here, the base material 110, the temperature sensor layer 200, and the cover layer 130 include a flexible material so as to be easily attached to a curved surface.

The base material 110 may have an adhesive lower surface. The base material 110 may contain a medical dermal contactable adhesive that may be applied to the skin of human body. In some embodiments, the adhesive applied to the lower surface of the base material 110 may be hydrocolloid for medical use or silicon that is harmless to the human body, does not cause allergic reaction, and has an excellent adhesive performance. The base material 110 may have an adhesive surface on its own, or may include an additional adhesive layer on a lower surface of a flexible material. In some embodiments, the base material 110 may include a non-woven fabric having an adhesive layer on a lower portion thereof. Since the adhesive type thermometer 1 may be directly adhered to the skin via the base material 110, the adhesive type thermometer 1 is attached to the skin so that influences of external humidity, external temperature, etc. may be reduced.

The base material 110 may include a second opening 110*h* exposing a portion corresponding to the temperature sensor 210 in the temperature sensor layer 200. Since the base material 110 under the electrode pattern 210 is removed by the second opening 110*h*, the temperature of the human body may be transferred to the temperature sensor 210 without interference via the second opening 110*h*. Accordingly, the adhesive type thermometer 1 may measure the temperature more accurately.

Referring to FIGS. 4 to 6, the temperature sensor layer 200 is arranged on the base material 110. The temperature sensor layer 200 includes the temperature sensor 210 at a side thereof and the connection terminal 220 connected to the temperature sensor 210 at the other side thereof. In FIGS. 4 to 6, the temperature sensor 210 of the temperature sensor layer 200 may be provided as an electrode pattern 211 for sensing the temperature on a flexible substrate 201. That is, the temperature sensor layer 200 may include the flexible substrate 201, the electrode pattern 211 arranged on the flexible substrate 201, the connection terminals 220, and metal leads 230. Here, the electrode pattern 211 is arranged on a side of the flexible substrate 201, and the connection terminals 220 are arranged on the other side of the flexible substrate 201. The metal leads 230 are respectively connected to opposite end portions of the electrode pattern 210, and extend to the other side to be connected to the connection terminals 220. In some embodiments, the connection terminals 220 and the metal leads 230 may be integrally formed with each other. That is, the connection terminal 220 may denote an end of the metal lead 230, which is connected to the module terminal 22. However, one or more embodiments are not limited thereto. For example, a metal member may be additionally provided on the portion of the connection terminal 220. Location of the connection terminal 220 may vary.

The flexible substrate 201 may be any kind of substrate that includes an insulating material and is curved or bent as an arbitrary shape, but may be a polymer thin film substrate such as polyimide (PI), polyethylene terephthalate (PET), polyethylene (PE), and polyvinyl chloride (PVC) in view of adhesion.

The electrode pattern 211 may include a conductive polymer. In some embodiments, the electrode pattern 211 may include PEDOT:PSS. The electrode pattern 211 may be printed by using a conductive polymer ink in an inkjet printing method or a screen printing method. Since the electrode pattern 211 has a resistance varying depending on the temperature, a peripheral temperature may be identified by measuring the resistance of the electrode pattern 211.

The electrode pattern 211 may have a mesh structure as shown in FIG. 6. The mesh structure may be formed when a plurality of strings in a transverse direction and a plurality of strings in a longitudinal direction cross each other. Widths and intervals of the plurality of strings may vary depending on the design. When the electrode pattern 211 is formed as the mesh structure, an effect of connecting a plurality of sensors having serial structures in parallel with one another may be obtained, and thus, the mesh structure is stabilized with respect to noise and may be adopted to measure the temperature.

However, the shape of the electrode pattern 211 is not limited thereto. For example, the electrode pattern 211 may be modified variously as shown in FIGS. 7A and 7B.

Figure 7A:
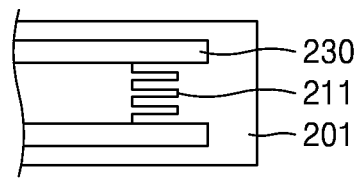
FIG. 7A is a plan view of an electrode pattern for sensing a temperature, according to an embodiment.
Figure 7B:
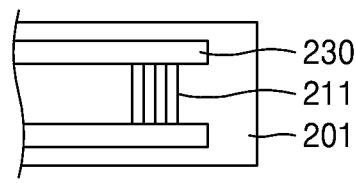
FIG. 7B is a plan view of an electrode pattern for sensing a temperature, according to an embodiment.

Referring to FIG. 7A, the electrode pattern 211 may be formed to have a structure of connecting a pair of the metal leads 230 as a square pulse type. The above structure may be referred to as a serial structure. The serial structure may have a large range of variation in the resistance with respect to the temperature variation, and may be used when sensitively measuring the temperature variation. Referring to FIG. 7B, the electrode pattern 211 may include a plurality of strings connecting the pair of metal leads 230. The above structure may be referred to as a parallel structure. The parallel structure may be adopted when measuring the temperature stably with respect to the noise, like the mesh structure.

The metal leads 230 respectively cover opposite ends of the electrode pattern 211 and are connected to the electrode pattern 211, and the metal leads 230 extend to the connection terminal 220 at the other side. The metal leads 230 may each include at least one metal material selected from the group consisting of Ag, Au, Pt, Al, Zn, Fe, Cu, Sn, Ni, and Pb. Since the metal leads 230 may respectively cover the opposite ends of the electrode pattern 211, the metal leads 230 may protrude from the surface of the electrode pattern 211. However, one or more embodiments are not limited thereto. For example, the metal leads 230 may be arranged under the electrode pattern 211. That is, the metal leads 230 are firstly formed on the flexible substrate 201, and the electrode pattern 211 is arranged on the metal leads 230 so that the metal leads 230 may be connected to the electrode pattern 211.

Lengths of the metal leads 230 may vary depending on sizes of the human body. For example, when the adhesive type thermometer 1 is used on toddlers, the lengths of the metal leads 230 may be relatively less than those of the adhesive type thermometer 1 for adults.

The cover layer 130 covers the temperature sensor layer 200 to protect the temperature sensor layer 200, and includes a first opening 130h exposing the connection terminal 220. That is, the cover layer 130 may cover most of the electrode pattern 211 and the metal leads 230 in the temperature sensor layer 200. The cover layer 130 may include a flexible base material. In some embodiments, the cover layer 130 may include non-woven fabric.

Although not shown in the drawings, an adhesive layer is disposed between the cover layer 130 and the temperature sensor layer 200, and thus, the cover layer 130 and the temperature sensor layer 200 may be attached to each other via the adhesive layer. Also, an adhesive layer may be arranged between the temperature sensor layer 200 and the base material 110, and thus, the temperature sensor layer 200 and the base material 110 may be attached to each other via the adhesive layer. Here, the adhesive layer may include an acryl adhesive.

The module holder 120 is arranged in the first opening 130h, and a portion of the temperature sensor layer 200, where the connection terminal 220 is arranged, is in the module holder 120. According to another aspect, the module holder 120 is interposed between the base material 110 and the temperature sensor layer 200.

Figure 8:
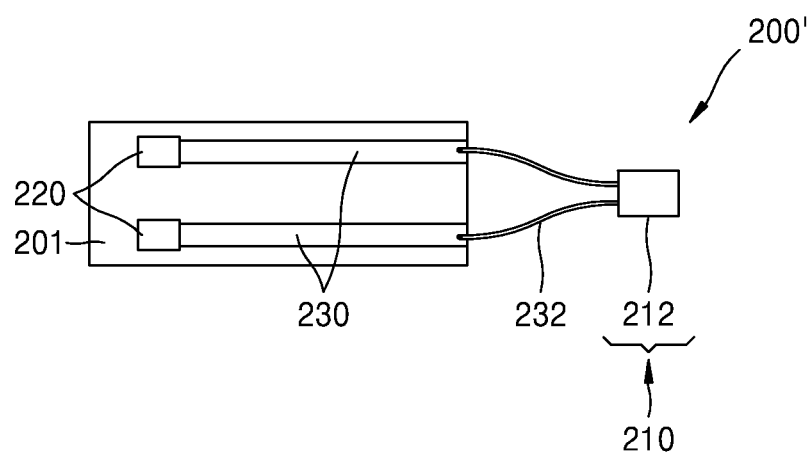
FIG. 8 is a diagram of a temperature sensor layer according to another embodiment.

FIG. 8 is a diagram of a temperature sensor layer 200' according to another embodiment. In FIG. 8, like reference numerals as those of FIG. 5 denote the same elements, and descriptions thereof are omitted for convenience of description.

Referring to FIG. 8, the temperature sensor layer 200' includes the temperature sensor 210 at a side thereof and the connection terminal 220 connected to the temperature sensor 210 at the other side thereof. The temperature sensor 210 may include a thermistor 212. The thermistor 212 denotes a temperature sensor that measures the temperature by using a resistance varying depending on the temperature. The thermistor 212 may include a polymer or a ceramic material. When the temperature sensor 210 includes the thermistor 212, the flexible substrate 201 may not be formed at the region of the temperature sensor 210.

In addition, the connection terminal 220 is arranged on the flexible substrate 201. The metal leads 230 connecting to the connection terminal 220 are arranged on the flexible substrate 201. An end of the metal lead 230 may be connected to the connection terminal 220, and the other end of the metal lead 230 may be connected to a connection line 232 of the thermistor 212 via soldering operation.

Figure 9A:
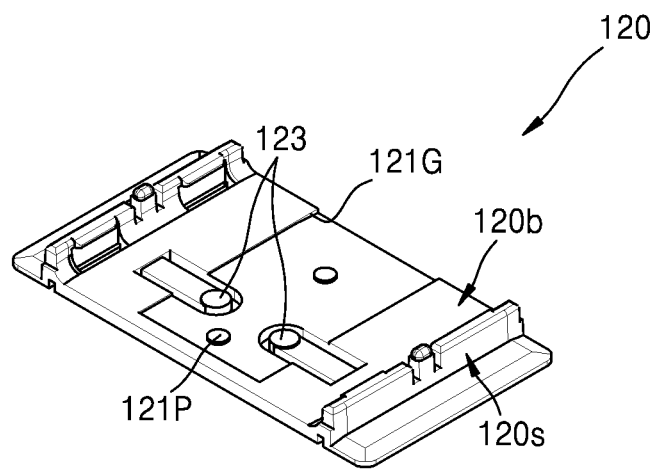
FIG. 9A is a perspective view of a module holder according to an embodiment.

The one or more embodiments are not limited to the shape of the temperature sensor layers 200 and 200', but may be modified variously. FIG. 9A is a perspective view of the module holder 120 in more detail, FIG. 9B is a perspective view of the temperature sensor layer 200 arranged on the module holder 120, and FIG. 9C is a diagram showing the module 20 mounted in the module holder 120.

Figure 9B:
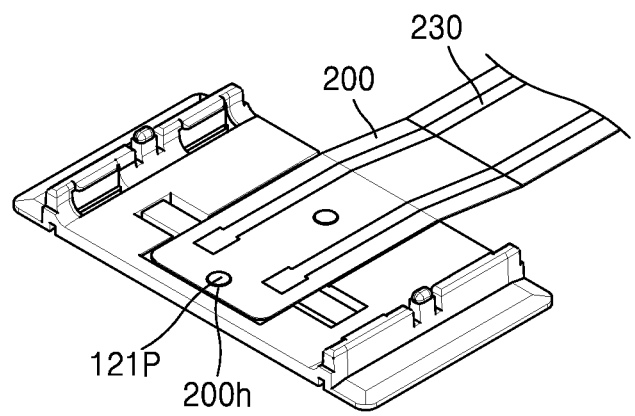
FIG. 9B is a perspective view of a temperature sensor film disposed on a module holder according to an embodiment.
Figure 9C:
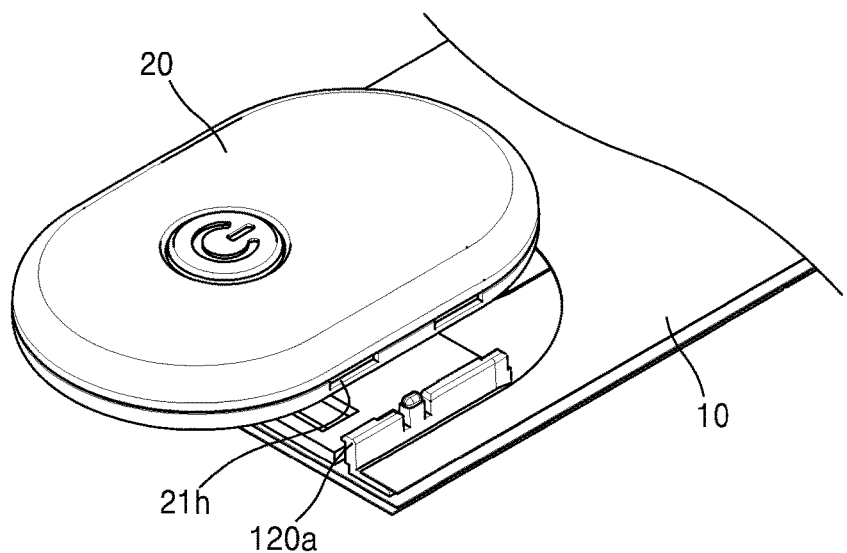
FIG. 9C is a diagram of a module mounted in a module holder according to an embodiment.

Referring to FIGS. 9A to 9C, the module holder 120 includes a bottom portion 120b and opposite side portions 120s connected perpendicularly to the bottom portion 120b. The bottom portion 120b may include a guide groove 121G and/or a guide pin 121P in which the temperature sensor layer 200 may be mounted. The guide groove 121G may be formed in the bottom portion 120b to be suitable for the mounting shape of the temperature sensor layer 200, and the guide pin 121P may protrude from the bottom portion 120b to be engaged with a guide hole 200h of the temperature sensor layer 200. The temperature sensor layer 200 and the module holder 120 may be easily aligned by the guide groove 121G and/or the guide pin 121P.

A pair of cantilevers 123 may be provided on the bottom portion 120b, wherein each of the cantilevers 123 has an end that is fixed and the other end that is a free end. The free end of the cantilever 123 may correspond to the connection terminal 220 of the temperature sensor layer 200. A predetermined protrusion may be provided at the free end. Since the free end may elastically move in an up-and-down direction, the connection terminal 220 and a module terminal 22 may elastically contact each other. The cantilever 123 may be formed by partially removing the bottom portion 120b according to the shape of the cantilever 123.

In addition, the housing 21 of the module 20 has an insertion recess 21h in a side surface thereof, so that a coupling portion 120a disposed in the side portion 120s of the module holder 120 is inserted to the insertion recess 21h and the module 20 may be stably coupled to the module holder 120, and the module terminal 22 and the connection terminal 220 are aligned to contact each other.

Figure 10:
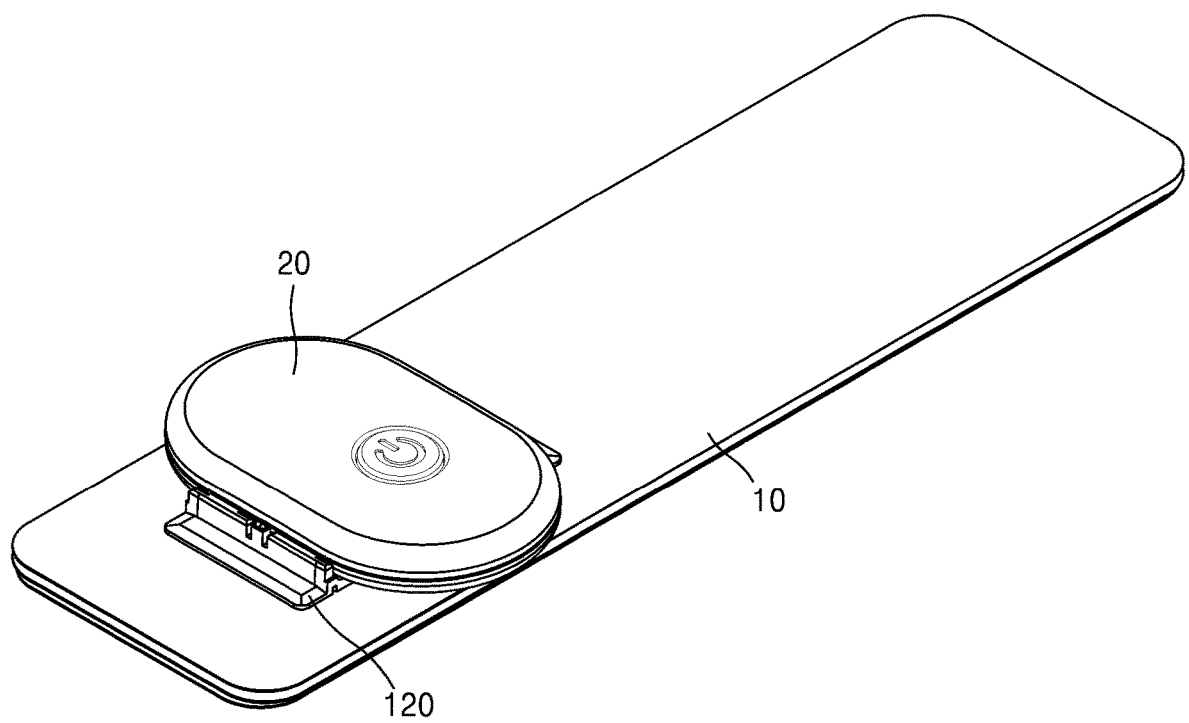
FIG. 10 is a diagram of an adhesive type thermometer according to another embodiment.

FIG. 10 is a diagram of an adhesive type thermometer according to another embodiment. In FIG. 10, like reference numerals as those of FIG. 2 denote the same elements, and descriptions thereof are omitted for convenience of description.

Referring to FIG. 10, the adhesive type thermometer includes the temperature sensor patch 10 and the module 20, and the temperature sensor patch 10 and the module 20 are provided to be easily attached to/detached from each other. The temperature sensor patch 10 and the module 20 may be coupled by inserting the module 20 to the module holder 120. In FIG. 10, the side surface where the coupling portion of the module holder 120 is disposed is arranged perpendicularly to a longer axis of the temperature sensor patch 10. The arrangement of the module holder 120 may be modified variously. For example, the side surface of the module holder 120 may be oblique with respect to the longer axis of the temperature sensor patch 10.

In addition, according to the arrangement of the module holder 120, locations of the module terminal 22 of the module 20 and the connection terminal 220 of the temperature sensor patch 10, the cantilevers 123, the guide hole 200*h*, and the guide pin 121P may be changed.

As described above, the temperature sensor patch according to the embodiment includes the module holder on an upper portion thereof so as to be easily attached to/detached from the module and be stably coupled to the module.

However, the scope of the invention is not limited to the above effects.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A temperature sensor patch comprising:
   a base material having a lower surface to attach to skin and an upper surface opposite the lower surface, wherein the lower surface is an adhesive surface;
   a temperature sensor layer having a lower surface including a temperature sensor and an upper surface including a connection terminal, wherein part of the lower surface of the temperature sensor layer is arranged on the upper surface of the base material, wherein the temperature sensor is disposed at a first side of the temperature sensor layer and the connection terminal is connected to the temperature sensor and disposed at a second different side of the temperature sensor layer;
   a cover layer configured to cover part of the upper surface of the temperature sensor layer, the cover layer comprising an opening exposing the connection terminal; and
   a module holder disposed inside the opening,
   wherein a portion of the second side of the temperature sensor layer is disposed on the module holder.

2. The temperature sensor patch of claim 1, wherein the base material comprises an opening exposing the temperature sensor.

3. The temperature sensor patch of claim 1, wherein the temperature sensor of the temperature sensor layer is formed by printing an electrode pattern for sensing temperature on a flexible substrate by using a conductive polymer ink.

4. The temperature sensor patch of claim 1, wherein the temperature sensor of the temperature sensor layer comprises a thermistor, and the connection terminal is arranged on a flexible substrate.

5. The temperature sensor patch of claim 1, wherein the part of the upper surface of the temperature sensor layer and the cover layer are attached by an upper adhesive layer, and the cover layer comprises a non-woven fabric.

6. The temperature sensor patch of claim 1, wherein the module holder comprises a cantilever having a fixed end and a free end, and a location of the cantilever corresponds to a location of the connection terminal.

7. An adhesive type thermometer comprising:
   a temperature sensor patch; and
   a module attachable with and detachable from the temperature sensor patch and configured to sense temperature,
   wherein the temperature sensor patch includes:
      a base material having a lower surface to attach to skin and an upper surface opposite the lower surface, wherein the lower surface is an adhesive surface;
      a temperature sensor layer having a lower surface including a temperature sensor and an upper surface including a connection terminal, wherein part of the lower surface of the temperature sensor layer is arranged on the upper surface of the base material, wherein the temperature sensor is disposed at a first side of the temperature sensor layer and the connection terminal is connected to the temperature sensor and disposed at a second different side of the temperature sensor layer; and
      a module holder on which a portion of the second side of the temperature sensor layer is disposed, and
   the module includes:
      a housing, through which a module terminal is exposed to outside;
      a battery arranged in the housing;
      a controller configured to calculate a temperature value; and
      a transmitter configured to wirelessly transmit the temperature value,
   wherein the module terminal and the connection terminal contact each other when the module is coupled to the module holder.

8. The adhesive type thermometer of claim 7, wherein the temperature sensor patch further comprises:
   a cover layer configured to cover part of the upper surface of the temperature sensor layer, the cover layer comprising an opening exposing the connection terminal, and
   the module holder is arranged in the opening.

9. The adhesive type thermometer of claim 8, wherein the base material comprises an opening exposing the temperature sensor.

10. The adhesive type thermometer of claim 7, wherein the temperature sensor of the temperature sensor layer is formed by printing an electrode pattern for sensing temperature on a flexible substrate by using a conductive polymer ink.

11. The adhesive type thermometer of claim 7, wherein the temperature sensor of the temperature sensor layer comprises a thermistor, and the connection terminal is arranged on a flexible substrate.

12. The adhesive type thermometer of claim 7, wherein the module holder comprises a cantilever having a fixed end and a free end, and a location of the cantilever corresponds to a location of the connection terminal.

* * * * *